(12) United States Patent
Zhang et al.

(10) Patent No.: US 10,803,071 B2
(45) Date of Patent: Oct. 13, 2020

(54) PRESENTING A DATA HANDLING METHOD ON A GRAPHICAL USER INTERFACE

(71) Applicant: Alibaba Group Holding Limited, George Town (KY)

(72) Inventors: Junjie Zhang, Hangzhou (CN); Yu Zhang, Hangzhou (CN); Di Xu, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 344 days.

(21) Appl. No.: 15/717,455

(22) Filed: Sep. 27, 2017

(65) Prior Publication Data

US 2018/0018336 A1    Jan. 18, 2018

Related U.S. Application Data

(63) Continuation of application No. PCT/CN2016/076412, filed on Mar. 15, 2016.

(30) Foreign Application Priority Data

Apr. 1, 2015 (CN) .......................... 2015 1 0151236

(51) Int. Cl.
*G06F 16/00* (2019.01)
*G06F 16/2457* (2019.01)
(Continued)

(52) U.S. Cl.
CPC ........ *G06F 16/24578* (2019.01); *G06F 9/451* (2018.02); *G06F 16/00* (2019.01);
(Continued)

(58) Field of Classification Search
CPC ................................................ G06F 16/24578
(Continued)

(56) References Cited

U.S. PATENT DOCUMENTS 8,595,031 B1 * 11/2013 Heffley .................. G06Q 40/08
705/4
2003/0060186 A1    3/2003 Lehto
(Continued)

FOREIGN PATENT DOCUMENTS

CA       2419566     2/2002
CN       1337034     2/2002
(Continued)

OTHER PUBLICATIONS

Written Opinion by the Intellectual Property Office of Singapore issued in Singapore Application No. 2018/4297353509Q dated May 21, 2018; 6 pages.
(Continued)

*Primary Examiner* — Chelcie L Daye
(74) *Attorney, Agent, or Firm* — Fish & Richardson P.C.

(57) ABSTRACT

A method for presenting a data handling method on a graphical user interface includes identifying a type of service associated with a pending data handling process, sending one or more user characterizations associated with a user's identity to a server for performing the data handling process, receiving data handling capabilities corresponding to one or more data handling methods for performing the identified type of service, determining one or more candidate data handling methods to be displayed on a graphical user interface (GUI) of the client computing device, initiating display of the candidate data handling methods on the client computing device GUI based on the data handling capabilities, performing the pending data handling process with a particular data handling method selected from the candidate data handling methods, and sending a performance result associated with the pending data handling process.

20 Claims, 2 Drawing Sheets

(51) Int. Cl.
*G06F 16/248* (2019.01)
*G06F 9/451* (2018.01)
*H04L 29/08* (2006.01)
*G06F 3/0482* (2013.01)

(52) U.S. Cl.
CPC .......... *G06F 16/248* (2019.01); *G06F 3/0482* (2013.01); *H04L 67/306* (2013.01)

(58) Field of Classification Search
USPC ........................................................ 707/723
See application file for complete search history.

(56) References Cited

U.S. PATENT DOCUMENTS

| | | | | |
|---|---|---|---|---|
| 2009/0281904 | A1* | 11/2009 | Pharris | G06Q 20/32 705/17 |
| 2011/0225057 | A1 | 9/2011 | Webb et al. | |
| 2014/0297523 | A1* | 10/2014 | Millary | G06Q 40/025 705/40 |

FOREIGN PATENT DOCUMENTS

| | | |
|---|---|---|
| CN | 1459068 | 11/2003 |
| CN | 102859544 | 1/2013 |
| JP | 2002535762 | 10/2002 |
| JP | 2003168040 | 6/2003 |
| JP | 2004506973 | 3/2004 |
| JP | 2011215834 | 10/2011 |
| KR | 20030040403 | 5/2003 |
| KR | 101330962 | 11/2013 |
| WO | WO200042581 | 6/2000 |
| WO | WO200214985 | 2/2002 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Application No. 16771249.6, dated Nov. 22, 2018, 7 pages.
International Search Report by International Searching Authority issued in International Application No. PCT/CN2016/076412 dated May 25, 2016; 9 pages.

\* cited by examiner

PRESENTING A DATA HANDLING METHOD ON A GRAPHICAL USER INTERFACE

This application is a continuation of PCT Application No. PCT/CN2016/076412, filed on Mar. 15, 2016, and claims priority over Chinese Patent Application No. 201510151236.X, filed on Apr. 1, 2015, the entire contents of each are hereby incorporated by reference.

TECHNICAL FIELD

This disclosure relates to data handling, and more particularly to presenting a data handling method on a graphical user interface (GUI).

BACKGROUND

With the development of Internet technologies, Internet-based application (or "Application") use is continuously increasing. Internet-based Applications have also become more complicated and generally require data handling to complete a pending data handling process. Some Applications can also present multiple data handling method options to a user to choose between.

When starting a data handling process on a client computing device (for example, a mobile computing device), more than one data handling method associated with a pending data handling process can be displayed on a GUI in a random or non-specific order. From the available data handling methods, a user can select a particular data handling method to perform the pending data handling process. In some cases, due to limitations of the computing device's screen size, data handling methods better suited to handling the pending data handling process may not fit into one GUI screen and can be hidden from view. For example, a user may need to scroll down or expand a list of options within the GUI to select a data handling method option that is determined by the user to be most suitable for the pending data handling process. This process can be time consuming and can reduce overall data handling efficiency.

SUMMARY

The present disclosure describes presenting data handling methods on a graphical user interface (GUI) of client computing device based on data handling capability information obtained by a server.

In an implementation, a type of service associated with a pending data handling process is identified. One or more user characterizations associated with a user's identity are sent to a server for performing the data handling process. Data handling capabilities corresponding with one or more data handling methods are received from the server for performing the identified type of service based on the one or more user characterizations. One or more candidate data handling methods to be displayed on a graphical user interface of the client computing device are determined based on the received data handling capabilities. Display of the candidate data handling methods on the client computing device graphical user interface is initiated based on the data handling capabilities. The pending data handling process is performed with a particular data handling method selected from the candidate data handling methods. A performance result associated with the pending data handling process is sent to the server and for the server to update data handling capabilities associated with the candidate data handling methods. The performance result indicates whether the pending data handling process was successfully performed using the particular data handling method.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, to prioritize data handling methods on a GUI interface for user selection. The data handling methods are prioritized in an order reflecting likely user selection. The prioritization can improve efficiency in selecting a data handling method to perform an associated data handling process. Other advantages will be apparent to those of ordinary skill in the art.

The details of one or more implementations of the subject matter of this specification are set forth in the Detailed Description, the claims, and the accompanying drawings. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes presenting data handling methods on a graphical user interface (GUI) of a client computing device, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined can be applied to other implementations and applications, without departing from the scope of the present disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

With the development of Internet technologies, Internet-based application (or "Application") use is continuously increasing. Internet-based Applications have also become more complicated and generally require data handling to complete a pending data handling process. Some Applications can also present multiple data handling method options to a user to choose between.

When starting a data handling process on a client computing device (for example, a mobile computing device), more than one data handling method associated with a pending data handling process can be displayed on a GUI in a random or non-specific order. From the available data handling methods, a user can select a particular data handling method to perform the pending data handling process. In some cases, due to limitations of the computing device's screen size, data handling methods better suited to handling the pending data handling process may not fit into one GUI screen and can be hidden from view. For example, a user may need to scroll down or expand a list of options within the GUI to select a data handling method option that is determined by the user to be most suitable for the pending data handling process. In other cases, too many data handling methods are made available, where most of the data handling methods are unlikely to be selected by a user. This process can be time consuming and can reduce overall data handling efficiency.

A server can determine data handling capability information for a particular data handling method based on historical data handling methods previously used by the user (for example, on websites and in Applications). Using the determined data handling capability, the server can recommend one or more candidate data handling methods for presentation to the user to improve data handling process efficiency.

Figure 1:
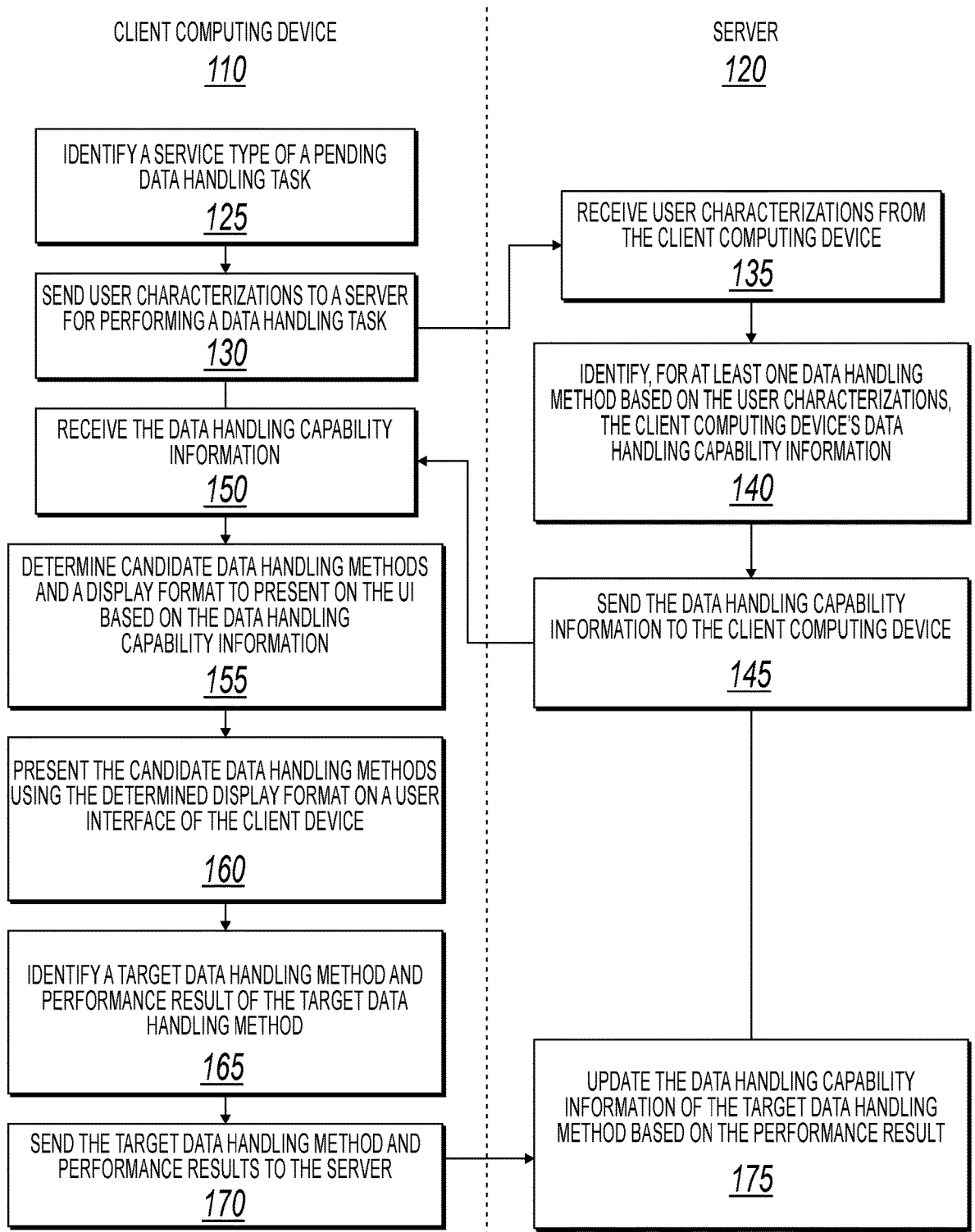
FIG. 1 is a flowchart illustrating an example method for presenting data handling methods on a graphical user interface (GUI) of a client computing device, according to an implementation of the present disclosure.

FIG. 1 is a flowchart illustrating an example method 100 for presenting data handling methods on a GUI of a client computing device, according to an implementation of the present disclosure. For clarity of presentation, the description that follows generally describes method 100 in the context of the other figures in this description. However, it will be understood that method 100 can be performed, for example, by any suitable system, environment, software, and hardware, or a combination of systems, environments, software, and hardware, as appropriate. In some implementations, various steps of method 100 can be run in parallel, in combination, in loops, or in any order. In some implementations, the example method 100 can be performed by a combination of a client computing device 110 and a server 120.

At 125, the client computing device 110 identifies a type of service associated with a pending data handling process. For example, if the pending data handling process is to make payment on a website, the type of service of the pending data handling process can be identified as an online payment. From 125, method 100 proceeds to 130.

At 130, the client computing device 110 sends one or more user characterizations to a server 120 for performing a pending data handling process. In some cases, user characterizations can include any user-specific information such as phone number, e-mail address, ID card number, name, International Mobile Equipment Identity (IMEI), International Mobile Subscriber Identification Number (IMSI), IP address, and MAC address. In some implementations, the user characterizations can be obtained from prior-recorded user behavior data (for example, recorded and stored based on the user's use of the client computing device). For example, when performing online shopping, a shopping website or an Application can obtain one or more user characterizations from a client computing device during a user payment process (such as the mobile phone number, e-mail address, name, or credit card information). From 130, method 100 proceeds to 135.

At 135, the server 120 receives the user characterizations from the client computing device 110. In some cases, the server 120 can identify a server-side user ID based on the received user characterizations. The server-side user ID can also be associated with a storage ID assigned by the server's 120 storage logic to refer to server-side data storage associated with the user. In some implementations, a user can have more than one user characterization, such as phone numbers or ID card numbers, but the user is restricted to one server-side user ID. In some cases, the server 120 can store and maintain one or more lists that map a user's server-side user ID to associated user characterizations. For example, the server 120 can maintain a list that maps associations between server-side user IDs and user phone numbers, and another list that maps associations between server-side user IDs and user ID card numbers.

In some cases, the server 120 can determine a priority order for user characterizations. A user characterization with high priority, if available, can be used to identify a user's server-side user ID. For example, if the server 120 determines that a user's phone number has a higher priority over the user's email address, and the phone number is included in the user characterizations received by the server 120, the server 120 can use the phone number to identify the user's server-side user ID. A particular example of a process to simplify server-side user ID identification and to reduce latency can include: 1) determining a priority for each user characterization; 2) identifying a user characterization that has the highest priority among the received user characterizations, and 3) identifying the user's server-side user ID based on a list that maps the identified user characterization to the server-side user ID. This example process can simplify the server-side user ID identify and reduce latency.

In some cases, the server 120 can send the user characterizations to one or more other servers. The one or more other servers can host one or more other websites or Applications that may have been (or will be) be visited or used by the user. The one or more other servers can also have data handling capability information of data handling methods for performing the user's pending data handling process. In some instances, this available information can be useful for the described methodology. From 135, method 100 proceeds to 140.

At 140, the server 120 identifies the client computing device's 110 data handling capability for at least one data handling method for the type of service of the pending data handling process. The data handling methods can include any methods provided by the server 120 for a user to perform the pending data handling process on the client computing device 110. Suitability of data handling methods with respect to a pending data handling process can be different for different type of services. For example, if the type of service of the pending data handling process is online payment, suitable data handling methods can include payment functions, such as payment by credit card, debit card, ALIPAY, or PAYPAL.

In some implementations, the data handling capability of a data handling method can, to at least some extent, indicate a likelihood that a user may select the data handling method to perform the pending data handling process. In some cases, the server 120 can determine a score the data handling methods based on their usage rates. For example, the higher the usage rate, the higher an associated score and the more likely the corresponding data handling method may be selected by a user. The score associated with each data handling method can be used as a data handling capability value.

The data handling capability can also be determined based on one or more values associated with the user's behavior data, such as the time the corresponding data handling method was used and a number of successful uses of the data handling method in a predetermined time period. For example, the later a particular data handling method was used or the more frequently it was used, the higher a determined data handling capability can be for the particular data handling method.

The data handling capability of the data handling methods can be stored and maintained by the server 120. In some cases, the server 120 can obtain behavior data related to a user's use of the data handling methods, and generate data handling capability values for the data handling methods based on the behavior data. The data handling capability can then be associated with the user's server-side user ID and stored in the server 120.

In some cases, the server 120 can obtain behavior data from other network-accessible websites or Applications (for example, over the Internet) in addition to behavior data associated with a website or Application associated with the pending data handling process. In other words, the server 120 can collect a user's behavioral data used on multiple websites and Applications to improve the accuracy of determining data handling capabilities associated with data handling methods. Obtaining data from multiple websites and Applications can be beneficial when the website or Application currently used by the client computing device 110 may have been used less often, less recently, or has a relatively small amount of behavioral data. Additionally, by gathering behavior data from other available websites or Applications, more candidate data handling methods may be available to represent to a user.

For example, assume that the client computing device 110 has a pending data handling process on a first website, the client computing device 110 or a first server that hosts the first website can send user characterizations associated with the user to a second server. The second server can obtain data handling capability information about the user for at least one data handling method according to the user characterizations associated with the user from other websites and Applications, and return the obtained data handling capability information for the at least one data handling method to the first server or the client computing device 110. The first server or the client computing device 110 can determine candidate data handling methods and their corresponding display format to be displayed on the client computing device 110.

In some cases, the second server can request data handling capability information from servers associated with other websites and Applications. In some other cases, the servers of other websites and Applications can send corresponding data handling capability information to the second server after a successful use of a data handling method by the user on the other websites or Applications. In some cases, instead of using a second server, the first server that hosts or serves the first website can obtain data handling capability information about the user from other websites and Applications, and return the obtained data handling capability information to the client computing device 110.

As an example, for a particular data handling method associated with an online payment process (data handling process), the data handling capability associated with a user can be represented by a score calculated based on the user's familiarity and acceptance level in using the particular data handling method in a network. Generally, the higher the familiarity and acceptance level of a particular data handling method is, the higher the data handling capability the particular data handling method is considered to have, and the more likely the particular data handling method will be successfully performed for the user's pending data handling process on the client computing device 110 (or, in other words, the more likely the user is to select the data particular data handling method for the pending data handling process. Assume that a user's pending payment process is to make a payment on a website A (first website), the client computing device 110 can send a request to a server B (second server) using Website A. The request can include one or more user characterizations associated with the user. Server B can collect data handling capability information for available payment methods based on the user characterizations and return the information to server A (first server) associated with website A. Server A can then determine suitable payment methods to be displayed on a GUI of the client computing device 110 based on the data handling capability information. If a payment method has a higher overall data handling capability, that is, it is used more often, more recently, or has a higher success rate across the network, it may be considered to have a higher priority and selected as a candidate data handling method to be displayed on the client computing device 110 over a data handling method previously used on website A.

In some cases, a server 120 may only manage or provide a data handling method or data handling capability information of data handling methods it hosts or serves. For example, an ALIPAY server may only manage the ALIPAY payment method. In some cases, a server 120 can manage or provide a plurality of data handling methods or corresponding data handling capability information. For example, some ALIPAY servers can manage a plurality of payment methods, such as those provided by ALIPAY, WECHAT PAY, APPLE PAY, and PAYPAL. From 140, method 100 proceeds to 145.

At 145, the server 120 sends data handling capability information of the at least one data handling method to the client computing device 110. From 145, method 100 proceeds to 150.

At 150, the client computing device 110 receives the data handling capability information. From 150, method 100 proceeds to 155.

At 155, the client computing device 110 determines candidate data handling methods and a display format to present on the GUI of the client computing device 110. The determination can be based on the received data handling capability information. From 155, method 100 proceeds to 160.

At 160, the example method 100 presents the candidate data handling methods using the determined display format on the GUI of the client computing device 110.

Candidate data handling methods can be those determined by the server 120 from available data handling methods to be presented on the client computing device 110 based on the data handling capability information. A user can then select a data handling method from the candidate data handling methods to perform the pending data handling process. The selected data handling method is considered to be a target data handling method. For example, data handling methods for payment services can include those provided by credit cards, debit cards, ALIPAY, WECHAT PAY, APPLE PAY, PAYPAL, or TENPAY. The server 120 can decide, based on data handling capability information, that ALIPAY, WECHAT PAY, and PAYPAL are the candidate payment methods to present on the GUI of the client computing device 110. Presented with the data handling method options, the user can select ALIPAY as a target payment method for a pending payment.

In some cases, the display format can include a display order for the candidate data handling methods (for example, a ranking based on the data handling capability score associated with particular candidate data handling methods), font size/color, whether to annotate or highlight certain candidate data handling methods, or other options to make one or more particular data handling methods stand out on the GUI with respect to other data handling methods. The display format can, to some extent, represent the likelihood that each candidate data handling methods may be selected, as determined by the server 120. For example, the candidate data handling methods can be displayed in a descending order based on the data handling capability score or each data handling method as identified by the server 120.

In some cases, candidate data handling methods that have corresponding data handling capabilities or a usage likelihoods greater than a predetermined threshold, can have distinctive marks, text prompts, highlighting, or special textual format applied in their display in the GUI. In some cases, candidate data handling methods that have corresponding data handling capability or a usage likelihood lower than a predetermined threshold can be hidden in the GUI, and be shown when a list of candidate data handling methods is explicitly expanded by a user. In some cases, if a data handling method has a significantly higher data handling capability compared to other data handling methods, it can be presented in the GUI as a default data handling method without the need to be selected. In such cases, a switch option can be provided to the user on the GUI for selecting other candidate data handling methods if desired. In typical implementations, candidate data handling methods can be displayed according to their identifiers, names, icons, web addresses, or other data consistent with this disclosure.

In some cases, the client computing device 110 can determine candidate data handling methods or a display format for the candidate data handling methods based on the screen size or processing power of the device 110. For example, the client computing device 110 may be able to display more candidate data handling methods at the same time because the display size of the client computing device 110 is large. In some cases, the client computing device 110 can also determine not to display one or more candidate data handling methods that it is not configured to perform. In some cases, the server 120 can consider the technical specifications associated with a client computing device 110 when determining data handling capability information for a user that will use the client computing device 110 to perform the pending data handling process.

Identifying and displaying candidate data handling methods based on the data handling capability information can eliminate data handling methods with a lower likelihood to be used, prioritize data handling methods that are more likely to be selected, and improve overall efficiency in selecting a particular data handling method. From 160, method 100 proceeds to 165.

At 165, the client computing device 110 identifies a target data handling method and a performance result of the target data handling method. The target data handling method can be the data handling method from the candidate data handling methods used to perform the pending data handling process on the client computing device 110. The performance result can indicate whether the pending data handling process was successfully performed using the target data handling method. From 165, method 100 proceeds to 170.

At 170, the client computing device 110 sends the target data handling method and the performance result to the server 120. In some cases, sending the target data handling method can include sending an identifier corresponding to the target data handling method and an associated performance result value for storage/mapping. From 170, method 100 proceeds to 175.

At 175, the server 120 can update the data handling capability information of the target data handling method based on the performance result. For example, if the server 120 determines that the target data handling method selected is one of the candidate data handling methods provided by the server 120, and the target data handling method was successfully used to perform the pending data handling process, the server 120 can increase the data handling capability of the target data handling method associated with the server-side user ID. On the other hand, if a candidate data handling method was not selected, or the data handling process was not successfully performed, the data handling capability of the corresponding candidate data handling method or target data handling method associated with the server-side user ID can be decreased. The data handling capability information can be updated each time the user performs a data handling process, which can permit the server 120 to provide more accurate data handling method recommendations for future data handling processes.

In some cases, the server 120 can manage a list of data handling methods' data handling capability information for each server-side user ID it serves. In some cases, the server terminal can send the server-side user ID of a user to the client computing device 110 in advance to facilitate the process of identifying or updating the user's data handling capability information. In such cases, the client computing device 110 can send its server-side user ID to the server 120 for identifying its data handling capability information instead of sending user characterizations. Moreover, the client computing device 110 can send its server-side user ID together with the target data handling method and the performance result to the server 120 for updating data handling capability information associated with the server 120. The server 120 can directly use the server-side user ID to identify or update the data handling capability information instead of using user characterizations.

Figure 2:
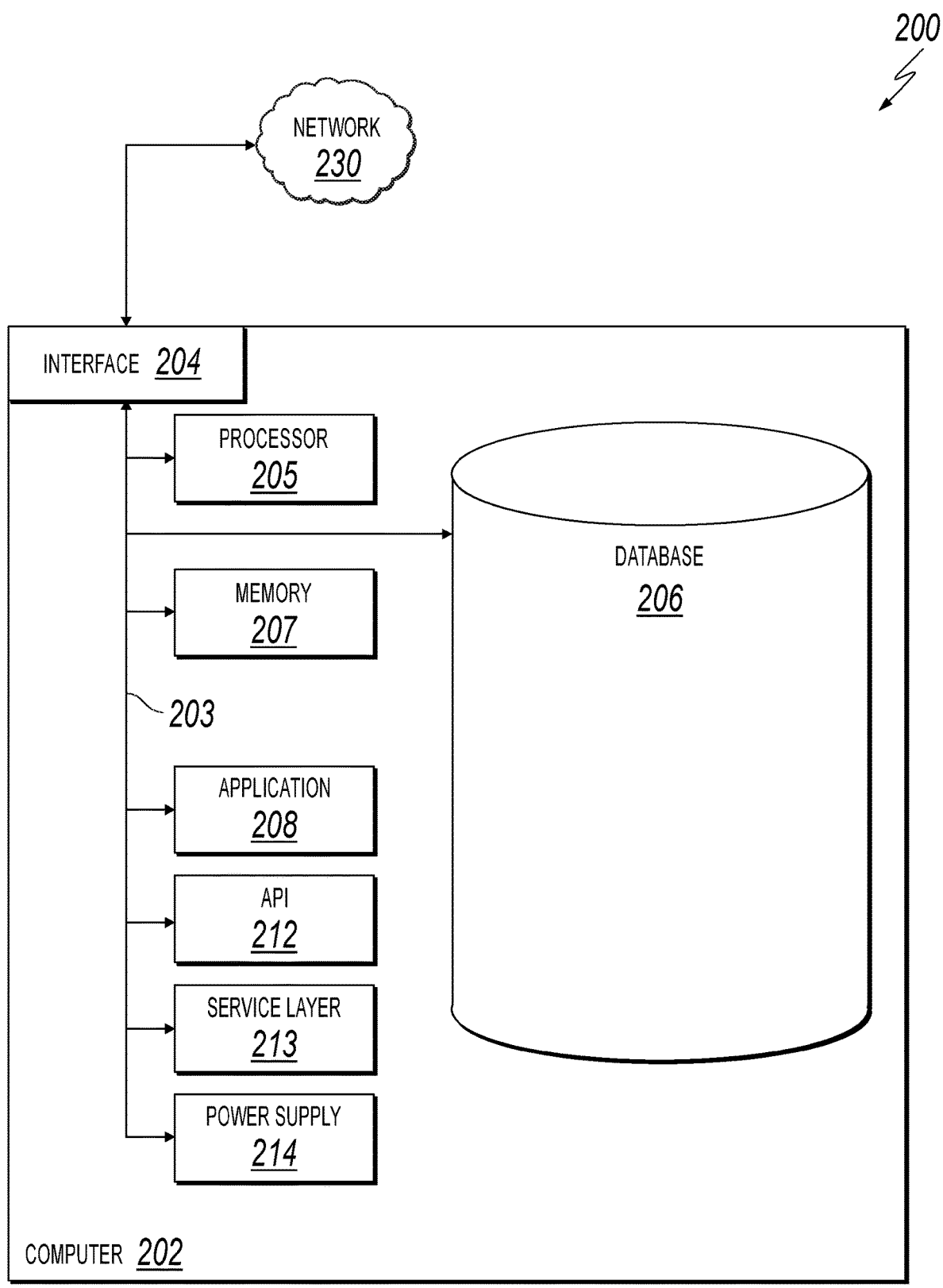
FIG. 2 is a block diagram of an example computer system used to provide computational functionalities associated with described algorithms, methods, functions, processes, flows, and procedures, according to an implementation of the present disclosure.

FIG. 2 is a block diagram illustrating an example of a computer system 200 used to provide computational functionalities associated with described algorithms, methods, functions, processes, flows, and procedures, according to an implementation of the present disclosure. The illustrated computer 202 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 202 can comprise a computer that includes an input device, such as a keypad, keyboard, touch screen, another input device, or a combination of input devices that can accept user information, and an output device that conveys information associated with the operation of the computer 202, including digital data, visual, audio, another type of information, or a combination of types of information, on a graphical-type user interface (UI) (or GUI) or other UI.

The computer 202 can serve in a role in a computer system as a client, network component, a server, a database or another persistency, another role, or a combination of roles for performing the subject matter described in the present disclosure. The illustrated computer 202 is communicably coupled with a network 230. In some implementations, one or more components of the computer 202 can be configured to operate within an environment, including cloud-computing-based, local, global, another environment, or a combination of environments.

At a high level, the computer 202 is an electronic computing device operable to receive, transmit, process, store, or manage data and information associated with the described subject matter. According to some implementations, the computer 202 can also include or be communicably coupled with a server, including an application server, e-mail server, web server, caching server, streaming data server, another server, or a combination of servers.

The computer 202 can receive requests over network 230 (for example, from a client software application executing on another computer 202) and respond to the received requests by processing the received requests using a software application or a combination of software applications. In addition, requests can also be sent to the computer 202 from internal users (for example, from a command console or by another internal access method), external or third-parties, or other entities, individuals, systems, or computers.

Each of the components of the computer 202 can communicate using a system bus 203. In some implementations, any or all of the components of the computer 202, including hardware, software, or a combination of hardware and software, can interface over the system bus 203 using an application programming interface (API) 212, a service layer 213, or a combination of the API 212 and service layer 213. The API 212 can include specifications for routines, data structures, and object classes. The API 212 can be either computer-language independent or dependent and refer to a complete interface, a single function, or even a set of APIs. The service layer 213 provides software services to the computer 202 or other components (whether illustrated or not) that are communicably coupled to the computer 202. The functionality of the computer 202 can be accessible for all service consumers using this service layer. Software services, such as those provided by the service layer 213, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 202, alternative implementations can illustrate the API 212 or the service layer 213 as stand-alone components in relation to other components of the computer 202 or other components (whether illustrated or not) that are communicably coupled to the computer 202. Moreover, any or all parts of the API 212 or the service layer 213 can be implemented as a child or a sub-module of another software module, enterprise application, or hardware module without departing from the scope of the present disclosure.

The computer 202 includes an interface 204. Although illustrated as a single interface 204 in FIG. 2, two or more interfaces 204 can be used according to particular needs, desires, or particular implementations of the computer 202. The interface 204 is used by the computer 202 for communicating with another computing system (whether illustrated or not) that is communicatively linked to the network 230 in a distributed environment. Generally, the interface 204 is operable to communicate with the network 230 and comprises logic encoded in software, hardware, or a combination of software and hardware. More specifically, the interface 204 can comprise software supporting one or more communication protocols associated with communications such that the network 230 or interface's hardware is operable to communicate physical signals within and outside of the illustrated computer 202.

The computer 202 includes a processor 205. Although illustrated as a single processor 205 in FIG. 2, two or more processors can be used according to particular needs, desires, or particular implementations of the computer 202. Generally, the processor 205 executes instructions and manipulates data to perform the operations of the computer 202 and any algorithms, methods, functions, processes, flows, and procedures as described in the present disclosure.

The computer 202 also includes a database 206 that can hold data for the computer 202, another component communicatively linked to the network 230 (whether illustrated or not), or a combination of the computer 202 and another component. For example, database 206 can be an in-memory, conventional, or another type of database storing data consistent with the present disclosure. In some implementations, database 206 can be a combination of two or more different database types (for example, a hybrid in-memory and conventional database) according to particular needs, desires, or particular implementations of the computer 202 and the described functionality. Although illustrated as a single database 206 in FIG. 2, two or more databases of similar or differing types can be used according to particular needs, desires, or particular implementations of the computer 202 and the described functionality. While database 206 is illustrated as an integral component of the computer 202, in alternative implementations, database 206 can be external to the computer 202.

The computer 202 also includes a memory 207 that can hold data for the computer 202, another component or components communicatively linked to the network 230 (whether illustrated or not), or a combination of the computer 202 and another component. Memory 207 can store any data consistent with the present disclosure. In some implementations, memory 207 can be a combination of two or more different types of memory (for example, a combination of semiconductor and magnetic storage) according to particular needs, desires, or particular implementations of the computer 202 and the described functionality. Although illustrated as a single memory 207 in FIG. 2, two or more memories 207 or similar or differing types can be used according to particular needs, desires, or particular implementations of the computer 202 and the described functionality. While memory 207 is illustrated as an integral component of the computer 202, in alternative implementations, memory 207 can be external to the computer 202.

The application 208 is an algorithmic software engine providing functionality according to particular needs, desires, or particular implementations of the computer 202, particularly with respect to functionality described in the present disclosure. For example, application 208 can serve as one or more components, modules, or applications. Further, although illustrated as a single application 208, the application 208 can be implemented as multiple applications 208 on the computer 202. In addition, although illustrated as integral to the computer 202, in alternative implementations, the application 208 can be external to the computer 202.

The computer 202 can also include a power supply 214. The power supply 214 can include a rechargeable or non-rechargeable battery that can be configured to be either user- or non-user-replaceable. In some implementations, the power supply 214 can include power-conversion or management circuits (including recharging, standby, or another power management functionality). In some implementations, the power-supply 214 can include a power plug to allow the computer 202 to be plugged into a wall socket or another power source to, for example, power the computer 202 or recharge a rechargeable battery.

There can be any number of computers 202 associated with, or external to, a computer system containing computer 202, each computer 202 communicating over network 230. Further, the term "client," "user," or other appropriate terminology can be used interchangeably, as appropriate, without departing from the scope of the present disclosure. Moreover, the present disclosure contemplates that many users can use one computer 202, or that one user can use multiple computers 202.

Described implementations of the subject matter can include one or more features, alone or in combination.

For example, in a first implementation, a computer-implemented method, comprising: identifying a type of service associated with a pending data handling process; sending one or more user characterizations associated with a user's identity to a server for performing the data handling process; receiving from the server and based on the one or more user characterizations, data handling capabilities corresponding to one or more data handling methods for performing the identified type of service; determining one or more candidate data handling methods to be displayed on a graphical user interface of the client computing device based on the received data handling capabilities; initiating display of the candidate data handling methods on the client computing device graphical user interface based on the data handling capabilities; performing the pending data handling process with a particular data handling method selected from the candidate data handling methods; and sending, to the server and for the server to update data handling capabilities associated with the candidate data handling methods, a performance result associated with the pending data handling process, wherein the performance result indicates whether the pending data handling process was successfully performed using the particular data handling method.

The foregoing and other described implementations can each, optionally, include one or more of the following features:

A first feature, combinable with any of the following features, further comprising receiving a user identification from the server, wherein the one or more user characterizations are the user identification.

A second feature, combinable with any of the previous or following features, further comprising: receiving a user identification from the server; and sending the received user identification with the performance result.

A third feature, combinable with any of the previous or following features, further comprising: determining a display format for the candidate data handling methods, wherein the display format includes a display order, and a candidate data handling method with higher data handling capability is displayed with a higher rank according to the display order; and initiating display of the candidate data handling methods according to the determined display format.

A fourth feature, combinable with any of the previous or following features, wherein the display format further includes setting a candidate data handling method with the highest data handling capability as a default data handling method for the type of service.

A fifth feature, combinable with any of the previous or following features, wherein the display format further includes showing candidate data handling methods that have data handling capabilities higher than a predetermined threshold and hiding candidate data handling methods that have data handling capabilities lower than a predetermined threshold.

A sixth feature, combinable with any of the previous or following features, wherein the display format further includes highlighting candidate data handling methods that have data handling capabilities higher than a predetermined threshold.

In a second implementation, a non-transitory, computer-readable medium storing one or more instructions executable by a computer system to perform operations comprising: identifying a type of service associated with a pending data handling process; sending one or more user characterizations associated with a user's identity to a server for performing the data handling process; receiving from the server and based on the one or more user characterizations, data handling capabilities corresponding to one or more data handling methods for performing the identified type of service; determining one or more candidate data handling methods to be displayed on a graphical user interface of the client computing device based on the received data handling capabilities; initiating display of the candidate data handling methods on the client computing device graphical user interface based on the data handling capabilities; performing the pending data handling process with a particular data handling method selected from the candidate data handling methods; and sending, to the server and for the server to update data handling capabilities associated with the candidate data handling methods, a performance result associated with the pending data handling process, wherein the performance result indicates whether the pending data handling process was successfully performed using the particular data handling method.

The foregoing and other described implementations can each, optionally, include one or more of the following features:

A first feature, combinable with any of the following features, further comprising receiving a user identification from the server, wherein the one or more user characterizations are the user identification.

A second feature, combinable with any of the previous or following features, further comprising: receiving a user identification from the server; and sending the received user identification with the performance result.

A third feature, combinable with any of the previous or following features, further comprising: determining a display format for the candidate data handling methods, wherein the display format includes a display order, and a candidate data handling method with higher data handling capability is displayed with a higher rank according to the display order; and initiating display of the candidate data handling methods according to the determined display format.

A fourth feature, combinable with any of the previous or following features, wherein the display format further includes setting a candidate data handling method with the highest data handling capability as a default data handling method for the type of service.

A fifth feature, combinable with any of the previous or following features, wherein the display format further includes showing candidate data handling methods that have data handling capabilities higher than a predetermined threshold and hiding candidate data handling methods that have data handling capabilities lower than a predetermined threshold.

A sixth feature, combinable with any of the previous or following features, wherein the display format further includes highlighting candidate data handling methods that have data handling capabilities higher than a predetermined threshold.

In a third implementation, a computer-implemented system, comprising: one or more computers; and one or more computer memory devices interoperably coupled with the one or more computers and having tangible, non-transitory, machine-readable media storing instructions that, when executed by the one or more computers, perform operations comprising: identifying a type of service associated with a pending data handling process; sending one or more user characterizations associated with a user's identity to a server for performing the data handling process; receiving from the server and based on the one or more user characterizations, data handling capabilities corresponding to one or more data handling methods for performing the identified type of service; determining one or more candidate data handling methods to be displayed on a graphical user interface of the client computing device based on the received data handling capabilities; initiating display of the candidate data handling methods on the client computing device graphical user interface based on the data handling capabilities; performing the pending data handling process with a particular data handling method selected from the candidate data handling methods; and sending, to the server and for the server to update data handling capabilities associated with the candidate data handling methods, a performance result associated with the pending data handling process, wherein the performance result indicates whether the pending data handling process was successfully performed using the particular data handling method.

The foregoing and other described implementations can each, optionally, include one or more of the following features:

A first feature, combinable with any of the following features, further comprising receiving a user identification from the server, wherein the one or more user characterizations are the user identification.

A second feature, combinable with any of the previous or following features, further comprising: receiving a user identification from the server; and sending the received user identification with the performance result.

A third feature, combinable with any of the previous or following features, further comprising: determining a display format for the candidate data handling methods, wherein the display format includes a display order, and a candidate data handling method with higher data handling capability is displayed with a higher rank according to the display order; and initiating display of the candidate data handling methods according to the determined display format.

A fourth feature, combinable with any of the previous or following features, wherein the display format further includes setting a candidate data handling method with the highest data handling capability as a default data handling method for the type of service.

A fifth feature, combinable with any of the previous or following features, wherein the display format further includes showing candidate data handling methods that have data handling capabilities higher than a predetermined threshold and hiding candidate data handling methods that have data handling capabilities lower than a predetermined threshold.

A sixth feature, combinable with any of the previous or following features, wherein the display format further includes highlighting candidate data handling methods that have data handling capabilities higher than a predetermined threshold.

For example, in a first implementation, a computer-implemented method, comprising: receiving a request for candidate data handling methods associated with an identified service from a client computing device, wherein the request includes one or more user characterizations, and wherein the identified service is associated with a pending data handling process; identifying, based on the user characterizations, one or more data handling capabilities associated with one or more corresponding data handling methods for the identified service from one or more servers that provide the identified service; sending the one or more identified data handling capabilities to the client computing device to determine the candidate data handling methods; receiving a performance result associated with the pending data handling process and a particular candidate data handling method selected on the client computing device to perform the pending data handling process; and updating, based on the performance result, the one or more data handling capabilities associated with the identified one or more candidate data handling methods, wherein the performance result indicates whether the pending data handling process was successfully performed using the particular candidate data handling method.

The foregoing and other described implementations can each, optionally, include one or more of the following features:

A first feature, combinable with any of the following features, [further comprising sending a user identification associated with the request, wherein the received one or more user characterizations are the user identification.

A second feature, combinable with any of the previous or following features, further comprising: identifying a user identification associated with a user based on the received one or more user characterizations; and identifying the one or more data handling capabilities associated with the user identification.

A third feature, combinable with any of the previous or following features, identifying a priority order of the one or more user characterizations; and using a user characterization of the one or more user characterizations with a highest priority order to identify the user identification based on a list that maps the user characterization to the user identification.

A fourth feature, combinable with any of the previous or following features, wherein updating the data handling capabilities further comprises increasing the data handling capability associated with the particular candidate data handling method that performs the pending data handling process if the performance is successful, and decreasing the data handling capability associated with the particular candidate data handling method that performs the pending data handling process if the performance is unsuccessful.

A fifth feature, combinable with any of the previous or following features, wherein updating the data handling capabilities further comprises decreasing data handling capabilities of the identified one or more candidate data handling methods that are not used to perform the pending data handling process.

In a second implementation, a non-transitory, computer-readable medium storing one or more instructions executable by a computer system to perform operations comprising: receiving a request for candidate data handling methods associated with an identified service from a client computing device, wherein the request includes one or more user characterizations, and wherein the identified service is associated with a pending data handling process; identifying, based on the user characterizations, one or more data handling capabilities associated with one or more corresponding data handling methods for the identified service from one or more servers that provide the identified service; sending the one or more identified data handling capabilities to the client computing device to determine the candidate data handling methods; receiving a performance result associated with the pending data handling process and a particular candidate data handling method selected on the client computing device to perform the pending data handling process; and updating, based on the performance result, the one or more data handling capabilities associated with the identified one or more candidate data handling methods, wherein the performance result indicates whether the pending data handling process was successfully performed using the particular candidate data handling method.

The foregoing and other described implementations can each, optionally, include one or more of the following features:

A first feature, combinable with any of the following features, [further comprising sending a user identification associated with the request, wherein the received one or more user characterizations are the user identification.

A second feature, combinable with any of the previous or following features, further comprising: identifying a user identification associated with a user based on the received one or more user characterizations; and identifying the one or more data handling capabilities associated with the user identification.

A third feature, combinable with any of the previous or following features, identifying a priority order of the one or more user characterizations; and using a user characterization of the one or more user characterizations with a highest priority order to identify the user identification based on a list that maps the user characterization to the user identification.

A fourth feature, combinable with any of the previous or following features, wherein updating the data handling capabilities further comprises increasing the data handling capability associated with the particular candidate data handling method that performs the pending data handling process if the performance is successful, and decreasing the data handling capability associated with the particular candidate data handling method that performs the pending data handling process if the performance is unsuccessful.

A fifth feature, combinable with any of the previous or following features, wherein updating the data handling capabilities further comprises decreasing data handling capabilities of the identified one or more candidate data handling methods that are not used to perform the pending data handling process.

In a third implementation, A computer-implemented system, comprising: one or more computers; and one or more computer memory devices interoperably coupled with the one or more computers and having tangible, non-transitory, machine-readable media storing instructions that, when executed by the one or more computers, perform operations comprising: receiving a request for candidate data handling methods associated with an identified service from a client computing device, wherein the request includes one or more user characterizations, and wherein the identified service is associated with a pending data handling process; identifying, based on the user characterizations, one or more data handling capabilities associated with one or more corresponding data handling methods for the identified service from one or more servers that provide the identified service; sending the one or more identified data handling capabilities to the client computing device to determine the candidate data handling methods; receiving a performance result associated with the pending data handling process and a particular candidate data handling method selected on the client computing device to perform the pending data handling process; and updating, based on the performance result, the one or more data handling capabilities associated with the identified one or more candidate data handling methods, wherein the performance result indicates whether the pending data handling process was successfully performed using the particular candidate data handling method.

The foregoing and other described implementations can each, optionally, include one or more of the following features:

A first feature, combinable with any of the following features, [further comprising sending a user identification associated with the request, wherein the received one or more user characterizations are the user identification.

A second feature, combinable with any of the previous or following features, further comprising: identifying a user identification associated with a user based on the received one or more user characterizations; and identifying the one or more data handling capabilities associated with the user identification.

A third feature, combinable with any of the previous or following features, identifying a priority order of the one or more user characterizations; and using a user characterization of the one or more user characterizations with a highest priority order to identify the user identification based on a list that maps the user characterization to the user identification.

A fourth feature, combinable with any of the previous or following features, wherein updating the data handling capabilities further comprises increasing the data handling capability associated with the particular candidate data handling method that performs the pending data handling process if the performance is successful, and decreasing the data handling capability associated with the particular candidate data handling method that performs the pending data handling process if the performance is unsuccessful.

A fifth feature, combinable with any of the previous or following features, wherein updating the data handling capabilities further comprises decreasing data handling capabilities of the identified one or more candidate data handling methods that are not used to perform the pending data handling process.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   identifying a type of service associated with a pending data handling process;
   sending one or more user characterizations associated with a user's identity to a server for performing the data handling process;
   receiving from the server and based on the one or more user characterizations, data handling capabilities corresponding to one or more data handling methods for performing the identified type of service;

determining one or more candidate data handling methods to be displayed on a graphical user interface of a client computing device based on the received data handling capabilities;

initiating display of the one or more candidate data handling methods on the client computing device graphical user interface based on the data handling capabilities;

performing the pending data handling process with a particular data handling method selected from the one or more candidate data handling methods; and sending, to the server and for the server to update the data handling capabilities associated with the one or more candidate data handling methods, a performance result associated with the pending data handling process, wherein the performance result indicates whether the pending data handling process was successfully performed using the particular data handling method, and wherein updating the data handling capabilities associated with the one or more candidate data handling methods is based on at least one of whether the pending data handling process was successfully performed or usage of the one or more candidate data handling methods.

2. The computer-implemented method of claim 1, further comprising receiving a user identification from the server, wherein the one or more user characterizations are the user identification.

3. The computer-implemented method of claim 1, further comprising:

receiving a user identification from the server; and sending the received user identification with the performance result.

4. The computer-implemented method of claim 1, further comprising:

determining a display format for the one or more candidate data handling methods, wherein the display format includes a display order, and a candidate data handling method with higher data handling capability is displayed with a higher rank according to the display order; and initiating display of the one or more candidate data handling methods according to the determined display format.

5. The computer-implemented method of claim 4, wherein the display format further includes setting a candidate data handling method with a highest data handling capability as a default data handling method for the type of service.

6. The computer-implemented method of claim 4, wherein the display format further includes showing candidate data handling methods that have data handling capabilities higher than a predetermined threshold and hiding candidate data handling methods that have data handling capabilities lower than a predetermined threshold.

7. The computer-implemented method of claim 6, wherein the display format further includes highlighting one or more particular candidate data handling methods that have data handling capabilities higher than a predetermined threshold.

8. A non-transitory, computer-readable medium storing one or more instructions executable by a computer system to perform operations comprising:

identifying a type of service associated with a pending data handling process;

sending one or more user characterizations associated with a user's identity to a server for performing the data handling process;

receiving from the server and based on the one or more user characterizations, data handling capabilities corresponding to one or more data handling methods for performing the identified type of service;

determining one or more candidate data handling methods to be displayed on a graphical user interface of a client computing device based on the received data handling capabilities;

initiating display of the one or more candidate data handling methods on the client computing device graphical user interface based on the data handling capabilities;

performing the pending data handling process with a particular data handling method selected from the one or more candidate data handling methods; and sending, to the server and for the server to update the data handling capabilities associated with the one or more candidate data handling methods, a performance result associated with the pending data handling process, wherein the performance result indicates whether the pending data handling process was successfully performed using the particular data handling method, wherein updating the data handling capabilities associated with the one or more candidate data handling methods is based on at least one of whether the pending data handling process was successfully performed or usage of the one or more candidate data handling methods.

9. The non-transitory, computer-readable medium of claim 8, further comprising receiving a user identification from the server, wherein the one or more user characterizations are the user identification.

10. The non-transitory, computer-readable medium of claim 8, further comprising:

receiving a user identification from the server; and sending the received user identification with the performance result.

11. The non-transitory, computer-readable medium of claim 8, further comprising:

determining a display format for the one or more candidate data handling methods, wherein the display format includes a display order, and a candidate data handling method with higher data handling capability is displayed with a higher rank according to the display order; and initiating display of the one or more candidate data handling methods according to the determined display format.

12. The non-transitory, computer-readable medium of claim 11, wherein the display format further includes setting a candidate data handling method with a highest data handling capability as a default data handling method for the type of service.

13. The non-transitory, computer-readable medium of claim 11, wherein the display format further includes showing candidate data handling methods that have data handling capabilities higher than a predetermined threshold and hiding candidate data handling methods that have data handling capabilities lower than a predetermined threshold.

14. The non-transitory, computer-readable medium of claim 13, wherein the display format further includes highlighting one or more particular candidate data handling methods that have data handling capabilities higher than a predetermined threshold.

15. A computer-implemented method, comprising:
- receiving a request for candidate data handling methods associated with an identified service from a client computing device, wherein the request includes one or more user characterizations, and wherein the identified service is associated with a pending data handling process;
- identifying, based on the user characterizations, one or more data handling capabilities associated with one or more corresponding data handling methods for the identified service from one or more servers that provide the identified service;
- sending the one or more identified data handling capabilities to the client computing device to determine the candidate data handling methods;
- receiving a performance result associated with the pending data handling process and a particular candidate data handling method selected on the client computing device to perform the pending data handling process; and
- updating, based on the performance result, the one or more data handling capabilities associated with the candidate data handling methods, wherein the performance result indicates whether the pending data handling process was successfully performed using the particular candidate data handling method, and wherein updating the data handling capabilities associated with the candidate data handling methods is based on at least one of whether the pending data handling process was successfully performed or usage of the candidate data handling methods.

16. The computer-implemented method of claim 15, further comprising sending a user identification associated with the request, wherein the received one or more user characterizations are the user identification.

17. The computer-implemented method of claim 15, further comprising:
- identifying a user identification associated with a user based on the received one or more user characterizations; and
- identifying the one or more data handling capabilities associated with the user identification.

18. The computer-implemented method of claim 17, wherein identifying a user identification further comprises:
- identifying a priority order of the one or more user characterizations; and
- using a user characterization of the one or more user characterizations with a highest priority order to identify the user identification based on a list that maps the user characterization to the user identification.

19. The computer-implemented method of claim 15, wherein updating the data handling capabilities further comprises increasing the data handling capability associated with the particular candidate data handling method that performs the pending data handling process if the performance is successful, and decreasing the data handling capability associated with the particular candidate data handling method that performs the pending data handling process if the performance is unsuccessful.

20. The computer-implemented method of claim 15, wherein updating the data handling capabilities further comprises decreasing data handling capabilities of the candidate data handling methods that are not used to perform the pending data handling process.

* * * * *